US010739656B2

(12) United States Patent
Dubrenat et al.

(10) Patent No.: US 10,739,656 B2
(45) Date of Patent: Aug. 11, 2020

(54) FAST HEAT TREATMENT METHOD FOR A COMPLETE ALL-SOLID-STATE ELECTROCHROMIC STACK

(71) Applicant: SAINT-GOBAIN GLASS FRANCE, Courbevoie (FR)

(72) Inventors: Samuel Dubrenat, Paris (FR); Martine Giret, Gagny (FR); Li-Ya Yeh, Geilenkirchen (DE); Jean-Christophe Giron, Edina, MN (US); Driss Lamine, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 304 days.

(21) Appl. No.: 15/540,793

(22) PCT Filed: Dec. 8, 2015

(86) PCT No.: PCT/FR2015/053382
§ 371 (c)(1),
(2) Date: Jun. 29, 2017

(87) PCT Pub. No.: WO2016/108000
PCT Pub. Date: Jul. 7, 2016

(65) Prior Publication Data
US 2018/0004058 A1 Jan. 4, 2018

(30) Foreign Application Priority Data
Dec. 31, 2014 (FR) ...................... 14 63473

(51) Int. Cl.
*C03C 17/34* (2006.01)
*G02F 1/1523* (2019.01)
*C03B 25/02* (2006.01)
*G02F 1/155* (2006.01)

(52) U.S. Cl.
CPC .......... *G02F 1/1523* (2013.01); *C03B 25/025* (2013.01); *C03C 17/3411* (2013.01); *C03C 17/3417* (2013.01); *G02F 1/155* (2013.01); *C03C 2217/219* (2013.01); *C03C 2217/228* (2013.01); *C03C 2217/231* (2013.01); *C03C 2217/948* (2013.01); *C03C 2218/156* (2013.01); *C03C 2218/32* (2013.01); *G02F 2001/1555* (2013.01)

(58) Field of Classification Search
CPC .............. C03B 25/025; C03C 17/3411; C03C 17/3417; C03C 2217/219; C03C 2217/228; C03C 2217/231; C03C 2217/948; C03C 2218/156; C03C 2218/32
USPC ............. 204/192.26, 192.27, 192.28, 192.29
See application file for complete search history.

(56) References Cited

U.S. PATENT DOCUMENTS

2011/0135837 A1    6/2011  Burdis et al.

FOREIGN PATENT DOCUMENTS

EP    1 696 261 A1    8/2006
FR    2 911 130 A1    7/2008

OTHER PUBLICATIONS

Machine Translation of FR 2911130 (Year: 2008).*
International Search Report as issued in International Patent Application No. PCT/FR2015/053382, dated Feb. 25, 2016.

* cited by examiner

*Primary Examiner* — Rodney G McDonald
(74) *Attorney, Agent, or Firm* — Pillsbury Winthrop Shaw Pitman LLP

(57) ABSTRACT

A process for manufacturing an electrochromic glazing unit includes forming, on one face of a glass sheet, a complete all-solid-state electrochromic stack including in succession a first layer of a transparent conductive oxide; a layer of a cathodically colored mineral electrochromic material to form an electrochromic electrode; a layer of an ionically conductive mineral solid electrolyte; a layer of a cation intercalation material to form a counter electrode; and a second layer of a transparent conductive oxide; then heat treatment of the complete electrochromic stack by irradiation with radiation having a wavelength comprised between 500 and 2000 nm, the radiation originating from a radiating device placed facing the electrochromic stack, a relative movement being created between the radiating device and the substrate so as to raise the electrochromic stack to a temperature at least equal to 300° C. for a brief duration, for example shorter than 100 milliseconds.

17 Claims, No Drawings

FAST HEAT TREATMENT METHOD FOR A COMPLETE ALL-SOLID-STATE ELECTROCHROMIC STACK

CROSS-REFERENCE TO RELATED APPLICATIONS

This application is the U.S. National Stage of PCT/FR2015/053382, filed Dec. 8, 2015, which in turn claims priority to French patent application number 1463473 filed Dec. 31, 2014. The content of these applications are incorporated herein by reference in their entireties.

The invention relates to the field of electrochromic glazing units. It more particularly relates to a process for heat treatment by irradiation of a complete mineral electrochromic stack on a transparent substrate.

Electrochromic devices and in particular electrochromic glazing units include, as is known, an electrochromic stack comprising a succession of five thin layers that are indispensable to operation of the device, i.e. to obtaining a reversible change in color following the application of an electrical potential. These five functional layers are the following:
 a first transparent electrically conductive layer;
 an electrochromic layer formed from a material the optical properties (absorbance/reflectance) of which vary as a function of its oxidation state;
 a layer of an ionically conductive and electronically insulating solid electrolyte;
 a counter electrode; and
 a second transparent electrically conductive layer;
one or other of the transparent electrically conductive layers possibly making contact with the transparent substrate.

In the most widespread electrochromic systems, these five layers all consist of inorganic solid materials, most often metal oxides, and are deposited by magnetron sputtering on a glass substrate, generally in one given deposition tool. They are commonly called "all-solid-state" electrochromic systems.

The most commonly used mineral electrochromic material is tungsten oxide. This oxide is a material that is what is referred to as an intercalation material that, when it is reduced by a supply of electrons originating from the first transparent electrically conductive layer, allows reversible insertion of protons or metal cations, in particular lithium ions. Tungsten oxide is a cathodically colored electrochromic material, i.e. a material that is colored in the reduced state and substantially bleached in the oxidized state.

This cathodically colored material is associated with a second cation intercalation material (counter electrode) that is either an anodically colored material (colored in the oxidized state/bleached in the reduced state) or a material that is colorless or only slightly colored and the optical properties of which do not change significantly as a function of its oxidation state.

The process for manufacturing by magnetron sputtering of such a mineral electrochromic system with at least five solid layers includes one or more heat treatment steps (anneals). Certain materials, especially the metal oxides forming the two outermost transparent conductive layers, are deposited by magnetron sputtering in a relatively amorphous form and must be crystallized hot, after deposition, in order to have a satisfactory crystallinity and conductivity. The performance and optical properties of the final product are highly dependent on these annealing steps.

The good conductivity of the transparent electrically conductive layers defines the uniformity of the coloration beyond a certain size of glazing unit and the rate of coloration/bleaching of the system. Therefore, it is generally sought to increase as much as possible the conductivity of the two transparent electrically conductive layers. An anneal in an annealing lehr at too high a temperature or for too long a time may however lead to a lowering of the electrochromic performance of the final product obtained, such as an increase in the resistance ($R_{square}$) of the TCOs or a decrease in the contrast between the colored state and the bleached state.

In the context of its research aiming to optimize the performance of glazing units including electrochromic stacks of at least five layers such as described above, the Applicant has trialed rapid heat treatments carried out by irradiating the surface of substrates coated with complete electrochromic stacks. Specifically, such rapid laser or flash-lamp treatments could advantageously replace the final anneal in a lehr, at about 400° C., conventionally carried out on the electrochromic glass sheet before its integration into a multiple glazing unit.

During such trials, the Applicant was surprised to notice that a rapid surface anneal by irradiation of the complete electrochromic stack comprising at least five layers not only allowed an electrochromic system equivalent in terms of contrast between the bleached and colored states to be obtained, but that the coloration/bleaching reactivity of the system was significantly improved, even when the rapid anneal by irradiation was carried out on a substrate subjected beforehand to a conventional anneal of about one hour in a lehr at 400° C.

A rapid anneal by irradiation, for example by laser, of a complete electrochromic system may thus advantageously replace a conventional anneal in a lehr, or indeed may be carried out in addition to such an anneal; in both cases, it will lead to a product that bleaches and recolors more rapidly than an identical product not subjected to an anneal by irradiation.

The rapid heat treatment by irradiation of the present invention, even after a prior final anneal in a lehr, neither degrades nor improves the overall contrast between the colored and bleached states. It makes it possible to obtain glazing units of uniform coloration of larger size than the known process providing only a final annealing step in a lehr at 400° C.

It is known that rapid heat treatments by irradiation of thin mineral coatings allow high-temperature anneals, i.e. at several hundreds of degrees, of coatings to be carried out while maintaining the subjacent substrate at relatively moderate temperatures.

The particularly surprising aspect in the present invention is the observation that the process for heat treatment by irradiation preserves certain layers within the annealed stack, while increasing the conductivity of the transparent electrically conductive layers, even after a final anneal carried out in an annealing lehr.

Therefore, the subject of the present invention is a process for manufacturing an electrochromic glazing unit comprising the following steps:
 (a) forming, on one face of a glass sheet, a complete all-solid-state electrochromic stack comprising in succession:
  a first layer of a transparent conductive oxide (TCO1);
  a layer of a cathodically colored mineral electrochromic material, which layer is called the electrochromic electrode (EC);
  a layer of an ionically conductive mineral solid electrolyte (CI);

a layer of a cation intercalation material, which layer is called the counter electrode (CE); and a second layer of a transparent conductive oxide (TCO2); and (b) heat treatment of this complete electrochromic stack, of at least five mineral layers, by irradiation with radiation having a wavelength comprised between 500 and 2000 nm, said radiation originating from a radiating device placed facing the electrochromic stack, a relative movement being created between said radiating device and said substrate so as to raise the electrochromic stack to a temperature at least equal to 300° C. for a brief duration, preferably shorter than 100 milliseconds.

The five mineral layers (TCO1/EC/CI/CE/TCO2) listed above are the only functional layers indispensable to the correct operation of the electrochromic glazing unit. The glass sheet serving as a carrier of the electrochromic stack may make contact with the first or second transparent conductive oxide layer. Preferably, the glass sheet makes contact with the first transparent conductive oxide layer (TCO1).

The electrochromic stack may comprise other useful layers, which are however not indispensable to obtaining an electrochromic behavior. It may for example include, between the glass substrate and the adjacent TCO layer, a barrier layer, known to prevent, for example, the migration of sodium ions. The stack may also comprise one or more antireflection layers including, for example, an alternation of and transparent layers with high and low refractive index, or even one or more layers covering the top TCO layer and serving to protect the stack from scratches and/or moisture.

The first part of the process according to the present invention, namely the manufacture of the electrochromic stack, includes a succession of steps known per se (see for example EP 1 696 261 in the name of the Applicant).

The glass substrate used is typically made of float glass that is optionally cut, polished and washed.

All of the mineral layers of the stack are preferably deposited by optionally reactive magnetron sputtering, generally in one given vacuum tool.

The materials capable of serving as transparent conductive oxides for the two TCO layers are known. Mention may be made by way of example of indium oxide, mixed indium tin oxide, tin oxide, doped tin oxide, zinc oxide, doped zinc oxide, ruthenium oxide, doped ruthenium oxide and aluminum- and/or gallium-doped zinc oxide. Mixed indium tin oxide (ITO) or aluminum- and/or gallium-doped zinc oxide will preferably be used. The thickness of each of the TCO layers is preferably comprised between 10 and 1000 nm, preferably between 50 and 800 nm.

The cathodically colored mineral electrochromic material of the electrochromic electrode EC is preferably nitrided and/or lithiated and/or hydrogenated tungsten oxide ($WO_x$) or a hydrogenated and/or lithiated and optionally nitrided oxide doped with one or more transition metals such as Nb, Zr, Ti. It is what is referred to as an intercalation material allowing reversible insertion of a large number of cations into its mineral structure. This material is advantageously deposited directly on the first TCO layer with a thickness preferably comprised between 100 nm and 2 µm and in particular between 200 nm and 1000 nm.

Next, the solid electrolyte is deposited on this electrochromic layer. Mineral solid electrolytes having a suitable cationic conductivity are known. Mention may be made, by way of example of preferred materials capable of being used by way of ionic conductor (IC) in the present invention, of those chosen from the group formed by silica ($SiO_2$), tantalum oxide ($Ta_2O_5$) and niobium oxide ($Nb_2O_5$). The IC layer may also be an oxide and/or nitride or oxynitride of general formula $MO_xH_yN_z$ where M is a transition metal or a mixture of a plurality of elements chosen from Ta, Si, Al, Nb, Zr, Ti and Bi. The IC layer may also be replaced by an interfacial region.

The thickness of the electrolyte layer is preferably comprised between about 10 nm and 70 nm and in particular between 20 nm and 60 nm.

In the following step, a second cation intercalation material is deposited by way of counter electrode (CE) on the solid electrolyte. When the cations used are lithium ions, this intercalation material is preferably mixed tungsten nickel oxide (NiWO). It may also be an optionally hydrated compound of formula $NiO_xLi_yN_zM_w$ where M is a transition metal or a mixture of transition metals.

When a protonic system is used, optionally hydrated nickel oxide or iridium oxide, or a mixture thereof, is preferably used by way of counter electrode intercalation material.

The thickness of the counter electrode is generally comprised between 50 nm and 600 nm and in particular between 150 nm and 250 nm.

When the cations exchanged, via the solid electrolyte, between the electrochromic material and the counter electrode are lithium ions, it is necessary to then introduce lithium into the electrochromic stack. This may be done by sputtering a layer of lithium metal onto the counter electrode layer. The penetration of the lithium ions into the material of the counter electrode, of the electrolyte and of the electrochromic material will occur during the final anneal, in the lehr and/or by irradiation.

When the cations exchanged, via the solid electrolyte, between the electrochromic material and the counter electrode are protons, the corresponding magnetron deposition steps are carried out with introduction of hydrogen into the plasma.

Then, to finish, a second TCO layer, typically substantially identical to that of the first TCO layer, is deposited.

In one embodiment of the process of the present invention, the substrate bearing the complete electrochromic stack is subjected immediately after the deposition of the last TCO layer (TCO1 or TCO2) to the step of heat treatment by irradiation. In other words, the substrate bearing the complete electrochromic stack is not subjected beforehand to a thermal annealing step in an annealing lehr.

In another embodiment, the heat treatment step is implemented on the annealed electrochromic substrate. In other words, in this embodiment the step of forming a complete all-solid-state electrochromic stack comprises a final annealing step of a few minutes, typically 1 to 5 minutes, in an annealing lehr at a temperature comprised between 350° C. and 450° C. and in particular between 370° C. and 410° C.

The first embodiment (without prior anneal) is particularly advantageous from the point of view of power consumption and results in a significant shortening of the manufacturing process.

The second embodiment (with prior anneal) is advantageous because it allows stacks with TCO layers that have particularly high conductivities to be obtained, thereby partially explaining the acceleration of the process of coloration/bleaching of the glazing unit.

According to one preferred embodiment, the radiating device is a laser, preferably a laser emitting a laser beam, forming at the electrochromic stack to be treated, a line covering the entire width of the electrochromic stack.

The laser radiation is preferably generated by modules comprising one or more laser sources and shaping and redirecting optics.

The laser sources are typically laser diodes or fiber-delivered lasers, especially fiber lasers, diode lasers or even disk lasers. Laser diodes allow high power densities, relative to the electrical supply power, to be achieved economically and with a small bulk. The bulk of fiber-delivered lasers is even smaller, and the power per unit length obtained may be even higher, at the expense of a higher cost. The expression "fiber-delivered lasers" is understood to mean lasers in which the place where the laser light is generated is spatially removed from the place to which it is delivered, the laser light being delivered by means of at least one optical fiber. In the case of a disk laser, the laser light is generated in a resonant cavity in which the emitting medium, which takes the form of a disk, for example a thin (about 0.1 mm in thickness) disk made of Yb:YAG, is found. The light thus generated is coupled to at least one optical fiber directed toward the place of treatment. Fiber or disk lasers are preferably optically pumped using laser diodes.

The laser sources preferably emit radiation continuously.

The wavelength of the laser radiation is comprised in a range extending from 500 to 2000 nm, preferably from 700 to 1100 nm and in particular from 800 to 1000 nm. Power laser diodes emitting at one or more wavelengths chosen from 808 nm, 880 nm, 915 nm, 940 nm or 980 nm have proved to be particularly suitable. In the case of a disk laser, the wavelength is for example 1030 nm (emission wavelength of a Yb:YAG laser). For a fiber laser, the wavelength is typically 1070 nm.

In the case of lasers not delivered by fiber, the shaping and redirecting optics preferably comprise lenses and mirrors and are used as means for positioning, homogenizing and focusing the radiation.

The aim of the positioning means is, if needs be, to arrange the radiation emitted by the laser sources in a line. Said means preferably comprise mirrors. The aim of the homogenizing means is to superpose the spatial profiles of the laser sources in order to obtain a homogeneous power per unit length all the way along the line. The homogenizing means preferably comprise lenses allowing the incident beams to be separated into secondary beams and said secondary beams to be recombined into a homogeneous line. The means for focusing the radiation allow the radiation to be focused on the electrochromic stack to be treated, in the form of a line of the desired length and width. The focusing means preferably comprise a focusing mirror or a convergent lens.

In the case of fiber-delivered lasers, the shaping optics are preferably assembled in the form of an optical head positioned at the exit of the or each optical fiber.

The shaping optics of said optical heads preferably comprise lenses, mirrors and prisms and are used as means for converting, homogenizing and focusing the radiation.

The converting means comprise mirrors and/or prisms and serve to convert the circular beam, output from the optical fiber, into a noncircular, anisotropic, line-shaped beam. To do this, the converting means increase the quality of the beam along one of its axes (fast axis, or axis of the width I of the laser line) and decrease the quality of the beam along the other (slow axis, or axis of the length L of the laser line).

The homogenizing means superpose the spatial profiles of the laser sources in order to obtain a homogeneous power per unit length all the way along the line. The homogenizing means preferably comprise lenses allowing the incident beams to be separated into secondary beams and said secondary beams to be recombined into a homogeneous line.

Lastly, the means for focusing the radiation allow the radiation to be focused on the working plane, i.e. on the plane of the electrochromic stack to be treated, in the form of a line of the desired length and width. The focusing means preferably comprise a focusing mirror or a convergent lens.

When a single laser line is used, the length of the line is advantageously equal to the width of the substrate. This length is typically at least 1 m, especially at least 2 m and in particular at least 3 m. A plurality of optionally separate lines may also be used, provided these lines are arranged to treat the entire width of the substrate. In this case, the length of each laser line is preferably at least 10 cm or 20 cm, especially comprised in a range extending from 30 to 100 cm, in particular from 30 to 75 cm and even from 30 to 60 cm.

The "length" of the line is understood to be its largest dimension as measured at the surface of the electrochromic stack, and the "width" of the line its dimension in a second direction perpendicular to the first. As is conventional in the field of lasers, the width (w) of the line corresponds to the distance, in this second direction, between the axis of the beam on which the intensity of the radiation is maximum and the point where the intensity of the radiation is equal to $1/e^2$ times the maximum intensity. If the longitudinal axis of the laser line is denoted x, a width distribution denoted w(x) may be defined along this axis.

The average width of the or each laser line is preferably at least 35 micrometers and especially comprised in a range extending from 40 to 100 micrometers or from 40 to 70 micrometers. Throughout the present text, the term "average" is understood to mean the arithmetic mean. Over the entire length of the line, the width distribution is narrow in order to limit as much as possible any treatment heterogeneity. Thus, the difference between the largest width and the smallest width is preferably at most 10% of the value of the average width. This value is preferably at most 5% and even 3%.

The shaping and redirecting optics, especially the positioning means, may be adjusted manually or using actuators allowing their positioning to be adjusted remotely. These actuators (typically motors or piezoelectric actuators) may be controlled manually and/or adjusted automatically. In the latter case, the actuators will preferably be connected to detectors and to a feedback loop.

At least some of the laser modules and even all of them are preferably placed in a sealed enclosure that is advantageously cooled, especially fan-cooled, in order to ensure their thermal stability.

The laser modules are preferably mounted on a rigid structure, called a "bridge", based on metal elements that are typically made of aluminum. The structure preferably does not comprise a marble sheet. The bridge is preferably positioned parallel to the conveying means so that the focal plane of the laser line remains parallel to the surface of the substrate to be treated. Preferably, the bridge comprises at least four feet, the height of which may be individually adjusted in order to ensure, whatever the case may be, that the bridge and conveying means are parallel to each other. The adjustment may be achieved by way of motors located in each foot, either manually, or automatically by means of a distance sensor. The height of the bridge may be modified (manually or automatically) to take into account the thickness of the substrate to be treated, and thus ensure that the plane of the substrate coincides with the focal plane of the laser line.

The power per unit length of the laser line is preferably at least 300 W/cm, advantageously 350 or 400 W/cm, especially 450 W/cm, even 500 W/cm and even 550 W/cm. It is even advantageously at least 600 W/cm, especially 800 W/cm and even 1000 W/cm. The power per unit length is measured at the place where the or each laser line on the electrochromic stack. It may be measured by placing a power detector on the line, for example a calorimetric power meter, especially such as the Beam Finder (S/N 2000716) power meter sold by Coherent Inc. The power is advantageously distributed homogeneously over the entire length of the or each line. Preferably, the difference between the highest power and the lowest power is less than 10% of the average power.

The energy density delivered to the electrochromic stack by the laser device is preferably at least 20 J/cm$^2$ and even at least 30 J/cm$^2$.

According to one preferred embodiment, the radiation originates from at least one intense pulsed light (IPL) lamp, this type of lamp being called a flash lamp below.

Such flash lamps generally take the form of glass or quartz tubes that are sealed and filled with a noble gas and that are equipped with electrodes at their ends. Under the effect of a short electrical pulse, obtained by discharging a capacitor, the gas ionizes and produces a particularly intense incoherent light. The emission spectrum generally comprises at least two emission lines; it is preferably a continuous spectrum having an emission maximum in the near ultraviolet.

The lamp is preferably a xenon lamp. It may also be an argon lamp, a helium lamp or a krypton lamp. The emission spectrum preferably comprises a plurality of lines, especially at wavelengths ranging from 160 to 1000 nm.

The length of each light pulse is preferably comprised in a range extending from 0.05 to 20 milliseconds and especially from 0.1 to 5 milliseconds. The repetition rate is preferably comprised in a range extending from 0.1 to 5 Hz and especially from 0.2 to 2 Hz.

The radiation may be emitted by a plurality of lamps placed side-by-side, for example 5 to 20 lamps, or even 8 to 15 lamps, so as to simultaneously treat a larger region. All the lamps may in this case emit flashes simultaneously.

The or each lamp is preferably placed transversely to the longest sides of the substrate. The or each lamp is preferably at least 1 m in length and especially 2 m and even 3 m in length so as to allow large substrates to be treated.

The capacitor is typically charged at a voltage from 500 V to 500 kV. The current density is preferably at least 4000 A/cm$^2$. The total energy density emitted by the flash lamps, divided by the area of the electrochromic stack, is preferably comprised between 1 and 100 J/cm$^2$, especially between 1 and 30 J/cm$^2$ and even between 5 and 20 J/cm$^2$.

The high energy densities and powers allow the electrochromic stack to be very rapidly heated to high temperatures.

In step (b) of the process according to the invention, each point of the electrochromic stack is preferably raised to a temperature of at least 300° C., especially 350° C., or even 400° C., and even 500° C. or 600° C. The maximum temperature is normally reached at the moment when the point of the stack in question passes under the radiating device, for example under the laser line or under the flash lamp. At a given instant, only the points of the surface of the electrochromic stack located under the radiating device (for example under the laser line) and in the immediate vicinity thereof (for example at less than 1 mm distance) are normally at a temperature of at least 300° C. For distances to the laser line (measured in the run direction) larger than 2 mm, especially 5 mm, including downstream of the laser line, the temperature of the electrochromic stack is normally at most 50° C. and even 40° C. or 30° C.

Each point of the electrochromic stack undergoes the heat treatment (or is raised to the maximum temperature) for a duration advantageously comprised in a range extending from 0.05 to 10 ms, especially from 0.1 to 5 ms, or from 0.1 to 2 ms. In the case of a treatment by means of a laser line, this duration is set both by the width of the laser line and by the speed of relative movement between the substrate and the laser line. In the case of a treatment by means of a flash lamp, this duration corresponds to the duration of the flash.

The flash lamp device may be installed inside the vacuum deposition system or outside thereof in a controlled atmosphere or in ambient air.

The laser radiation is partially reflected by the electrochromic stack to be treated and partially transmitted through the substrate. For reasons of safety, it is preferable to place, on the path of this reflected and/or transmitted radiation, means for stopping the radiation. It will typically be a question of metal jackets cooled by a flow of fluid, especially water. In order to prevent the reflected radiation from damaging the laser modules, the axis of propagation of the or each laser line preferably makes a nonzero angle with the normal to the substrate, typically an angle comprised between 5 and 20°.

In order to increase the efficiency of the treatment, it is preferable for at least some of the (main) laser ray transmitted through the substrate and/or reflected by the electrochromic stack to be redirected toward said substrate in order to form at least one secondary laser ray, said secondary ray preferably impacting the substrate in the same place as the main laser ray and advantageously having the same focal depth and the same profile. The or each secondary laser ray is advantageously formed using an optical assembly comprising only optical elements chosen from mirrors, prisms and lenses, especially an optical assembly consisting of two mirrors and a lens, or a prism and a lens. Recovering at least some of the main radiation lost and directing it toward the substrate considerably improves the heat treatment. The choice of whether to use the portion of the main ray transmitted through the substrate ("transmission" mode), the portion of the main ray reflected by the electrochromic stack ("reflection" mode) or optionally both, depends on the nature of the layer and the wavelength of the laser radiation.

When the substrate moves, especially translationally, it may be made to move using any mechanical conveying means, for example using belts, rollers or trays to provide a translational movement. The conveying system allows the speed of the movement to be controlled and adjusted. The conveying means preferably comprises a rigid chassis and a plurality of rollers. The pitch of the rollers is advantageously comprised in a range extending from 50 to 300 mm. The rollers preferably comprise metal rings, typically made of steel, covered with plastic covers. The rollers are preferably mounted on low-play end bearings, with typically three rollers per end bearing. In order to ensure the plane of conveyance is perfectly planar, the position of each of the rollers is advantageously adjustable. The rollers are preferably moved using pinions or chains, preferably tangential chains, driven by at least one motor.

The speed of the relative movement between the substrate and the or each radiation source (especially the or each laser line) is advantageously at least 2 m/min or 4 m/min, especially 5 m/min and even 6 m/min or 7 m/min, or even 8 m/min and even 9 m/min or 10 m/min. According to certain embodiments, in particular when the absorption of the radiation by the electrochromic stack is high or when the electrochromic stack may be deposited at high deposition rates, the speed of the relative movement between the substrate and the radiation source (especially the or each laser line or flash lamp) is at least 12 m/min or 15 m/min, especially 20 m/min and even 25 or 30 rn/min. In order to ensure the treatment is as homogeneous as possible, the speed of the relative movement between the substrate and the or each radiation source (especially the or each laser line or flash lamp) varies during the treatment by at most 10 rel %, especially 2 rel % and even 1 rel % relative to its nominal value.

Preferably, the or each radiation source (especially laser line or flash lamp) is stationary, and the substrate moves, so that the speed of the relative movement will correspond to the run speed of the substrate.

Another alternative, used in the semiconductor or photovoltaic device industry, consists in keeping the substrate stationary and scanning the surface with the laser beam or in moving the substrate under a scanned laser beam.

The invention is illustrated below using nonlimiting exemplary embodiments.

EXAMPLE 1

Laser Anneal of a Protonic All-solid-state Electrochromic Stack

On a sheet of Planilux® glass, in a magnetron sputtering tool, the following electrochromic stack was deposited:

Substrate: Planilux (100 mm×100 mm×2.1 mm)
TCO1: ITO (500 nm)
Electrochromic layer: $IrO_x$ (85 nm)
Solid electrolyte: $WO_3$ (100 nm)/$Ta_2O_5$ (200 nm)
Counter electrode: $H_xWO_3$ (400 nm)
TCO2: ITO (100 nm)

The first ITO layer was deposited at a temperature of 350° C. All the other layers were deposited without heating, except for the TCO2 which was deposited at a temperature above 100° C.

Samples according to the prior art were not subjected to a final thermal anneal in a lehr. Specifically, heating in a lehr of such a protonic electrochromic stack would lead to a degradation, or even loss, of the electrochromic behavior.

Samples according to the invention were subjected to a rapid heat treatment by laser. To do this, they were passed under a laser beam of a power comprised between about 1200 W and 1300 W (laser diode, 980 nm, CW mode) forming, in the working plane, a line of 100 mm length and 0.1 mm width. The run speed was 10 m/minute.

Table 1 below shows the light transmittance in the colored and bleached states of samples prepared with and without laser treatment, and the sheet resistance (R□) of the ITO layer deposited last (TCO2).

TABLE 1

| | $TL_{bleached}$ | $TL_{colored}$ | Contrast | R□ |
|---|---|---|---|---|
| Without laser anneal | 55% | 2% | 27.5 | 31 Ω/□ |
| With laser anneal | 63% | 1.5% | 42 | 27 Ω/□ |

It will be observed that the rapid heat treatment by laser decreased the resistance of the (ITO) TCO2 layer deposited last, thereby resulting in an increase in the (coloration/bleaching) switching speed of the samples.

Conversely to what might have been expected, the heating by laser of the complete electrochromic stack did not result in degraded electrochromic properties; on the contrary an improvement in contrast ($TL_{bleached}/TL_{colored}$) was observed. Moreover, light transmittance in the bleached state is significantly increased, which is surprising and difficult to obtain by other means.

Accelerated ageing trials at 80° C. showed that the longevity of the stacks is the same for the (laser treated) samples according to the invention and the comparative samples (which did not undergo a final heat treatment). The improvements due to the laser treatment (R□ and switching speed) were preserved throughout the accelerated ageing trial.

This example thus shows that the rapid heat treatment by laser of a protonic all-solid-state electrochromic stack allows the contrast and switching speed of the electrochromic glazing unit obtained to be improved.

EXAMPLE 2

Laser Anneal of a Lithium All-solid-state Electrochromic Stack

On a sheet of Planilux® glass, in a magnetron sputtering tool, the following electrochromic stack was deposited:

Substrate: Planilux (100 mm×100 mm×2.2 mm)
Antireflection coating
TCO1: ITO (350 nm)
Electrochromic layer: $WO_3$ (350 nm)
Solid electrolyte: $SiO_x$ (30 nm)
Counter electrode: $NiWO_x$ (250 nm)
TCO2: ITO (400 nm)
Antireflection coating Some of the samples were then subjected to a thermal anneal in a lehr (2 minutes at 400° C.). Other samples were not subjected to a thermal anneal. These samples were used as is for the evaluation of their electrochromic behavior.

Next, some of each of these batches of samples (with and without thermal anneal in a lehr) were subjected to a rapid heat treatment by laser under the following conditions:

Laser source: laser diodes 980 nm, CW mode
Laser power: about 1400 W
Run speed: 10 m/min The laser beam formed, in the working plane, a laser line of 100 mm length and 0.1 mm width.

Table 2 collates values of light transmittance (TL) in the colored and bleached states, contrast and sheet resistance (R□) for the comparative samples (with and without anneal in a lehr) and for the samples according to the invention (with and without prior anneal in a lehr).

TABLE 2

| | Comparative samples (without laser anneal) | | | | Samples according to the invention (with laser anneal) | | | |
|---|---|---|---|---|---|---|---|---|
| | $TL_{bleached}$ | $TL_{colored}$ | Contr | R□ | $TL_{bleached}$ | $TL_{colored}$ | Contr | R□ |
| Without anneal | 42% | 24% | 1.75 | 18 Ω/□ | 65% | 1.7 | 38 | 6.4 Ω/□ |
| With anneal | 65% | 1.6% | 40 | 6.5 Ω/□ | 66% | 1.8 | 37 | 5.7 Ω/□ |

It will be observed that, in terms of contrast, the samples according to the invention obtained after laser annealing were equivalent to the samples according to the prior art having undergone an anneal in a lehr. The rapid laser anneal, more rapid than the lehr anneal, may therefore advantageously replace the latter in a production line.

It will moreover be observed that the sheet resistance of samples subjected to a rapid laser anneal was substantially decreased relative to the comparative samples, even when the latter had undergone an anneal in a lehr beforehand. This decrease in R□ leads to an increase in the switching speed of the glazing units obtained, in particular the speed of coloration. Table 3 below collates coloration times ($T_{coloration}$) and bleaching times ($T_{bleaching}$) for the samples in table 2.

TABLE 3

| | Comparative samples (without laser anneal) | | Samples according to the invention (with laser anneal) | |
|---|---|---|---|---|
| | $T_{coloration}$ | $T_{bleaching}$ | $T_{coloration}$ | $T_{bleaching}$ |
| Without lehr anneal | >18 min | >10 min | 38 seconds | 22 seconds |
| With lehr anneal | 37 seconds | 21 seconds | 28 seconds | 18 seconds |

The invention claimed is:

1. A process for manufacturing an electrochromic glazing unit comprising:
   (a) forming, on one face of a glass sheet, a complete all-solid-state electrochromic stack comprising in succession:
      a first layer of a transparent conductive oxide;
      a layer of a cathodically colored mineral electrochromic material to form an electrochromic electrode;
      a layer of an ionically conductive mineral solid electrolyte;
      a layer of a cation intercalation material to form a counter electrode; and
      a second layer of a transparent conductive oxide; and
   (b) performing a heat treatment of the complete electrochromic stack by irradiation with radiation having a wavelength comprised between 500 and 2000 nm, said radiation originating from a radiating device placed facing the electrochromic stack, a relative movement being created between said radiating device and said glass sheet so as to raise the electrochromic stack to a temperature at least equal to 300° C. for a duration shorter than 100 milliseconds,
      wherein the temperature of a face of said glass sheet which is opposite said one face does not exceed 100° C. during the heat treatment.

2. The process as claimed in claim 1, wherein the forming of the complete all-solid-state electrochromic stack in step (a) comprises, before performing said heat treatment in step (b), carrying out a final annealing of the complete all-solid-state electrochromic stack in an annealing lehr.

3. The process as claimed in claim 1, wherein the transparent conductive oxide forming the first and second transparent conductive oxide layers is chosen from the group formed by mixed indium tin oxide (ITO) and aluminum- and/or gallium-doped zinc oxide.

4. The process as claimed in claim 1, wherein the cathodically colored mineral electrochromic material of the electrochromic electrode is tungsten oxide ($WO_x$).

5. The process as claimed in claim 1, wherein the cation intercalation material of the counter electrode is chosen from the group formed by mixed tungsten nickel oxide and iridium oxide.

6. The process as claimed in claim 1, wherein the ionically conductive mineral solid electrolyte is chosen from the group formed by silica, tantalum oxide and niobium oxide.

7. The process as claimed in claim 1, wherein the radiating device is a laser.

8. The process as claimed in claim 1, wherein the radiating device is a flash lamp.

9. The process as claimed in claim 1, wherein all thin layers of the electrochromic stack are deposited by magnetron sputtering.

10. The process as claimed in claim 2, wherein the final annealing is at a temperature comprised between 350 and 450° C.

11. The process as claimed in claim 10, wherein the final annealing is at a temperature between 370 and 410° C.

12. The process as claimed in claim 1, wherein the temperature of the face of said glass sheet which is opposite said one face does not exceed 50° C. during the heat treatment.

13. The process as claimed in claim 12, wherein the temperature of the face of said glass sheet which is opposite said one face does not exceed 30° C. during the heat treatment.

14. The process as claimed in claim 7, wherein the laser is configured to emit a laser beam forming at the electrochromic stack a line covering an entire width of the electrochromic stack.

15. The process as claimed in claim 1, wherein the heat treatment of the complete electrochromic stack by irradiation is performed in step (b) without carrying out a final annealing, between step (a) and step (b), of the complete all-solid-state electrochromic stack in an annealing lehr.

16. The process as claimed in claim 7, wherein an axis of propagation of a laser line emitted by the laser makes a nonzero angle with the normal to the glass sheet.

17. The process as claimed in claim 16, wherein the angle is between 5° and 20°.

* * * * *